(12) United States Patent
Courtois et al.

(10) Patent No.: US 12,508,060 B2
(45) Date of Patent: Dec. 30, 2025

(54) BONE-ANCHORED IMPLANT, AND METHOD FOR MANUFACTURING SUCH AN IMPLANT

(71) Applicant: Anthogyr, Sallanches (FR)

(72) Inventors: Nicolas Courtois, Passy (FR); Erik Adolfsson, Gothenburg (SE)

(73) Assignee: Anthogyr, Sallanches (FR)

( * ) Notice: Subject to any disclaimer, the term of this patent is extended or adjusted under 35 U.S.C. 154(b) by 591 days.

(21) Appl. No.: 17/963,409

(22) Filed: Oct. 11, 2022

(65) Prior Publication Data

US 2023/0130198 A1   Apr. 27, 2023

(30) Foreign Application Priority Data

Oct. 21, 2021  (EP) ..................................... 21203844

(51) Int. Cl.
*A61B 17/86* (2006.01)
*A61L 27/06* (2006.01)
*A61L 27/10* (2006.01)
*A61B 17/00* (2006.01)

(52) U.S. Cl.
CPC ............ *A61B 17/866* (2013.01); *A61L 27/06* (2013.01); *A61L 27/10* (2013.01); *A61B 2017/0088* (2013.01); *A61F 2310/00011* (2013.01)

(58) Field of Classification Search
CPC .............................. A61B 17/866; A61L 27/10
See application file for complete search history.

(56) References Cited

U.S. PATENT DOCUMENTS

| | | |
|---|---|---|
| 2013/0013081 A1 | 1/2013 | Fredriksson |
| 2017/0001920 A1 | 1/2017 | Berner |
| 2020/0246115 A1* | 8/2020 | Homann ................ A61C 13/00 |
| 2020/0368028 A1* | 11/2020 | Bellido-Gonzalez ....................... A61F 2/30767 |

* cited by examiner

*Primary Examiner* — Si Ming Ku
(74) *Attorney, Agent, or Firm* — William H. Eilberg

(57) ABSTRACT

An implant intended to be at least partially implanted into a bone, the implant including an implant part having an endosseous surface. The endosseous surface includes at least one zone having a surface topography exhibiting an arithmetic mean peak curvature parameter (Spc) which is less than or equal to 1 $\mu m^{-1}$, and a density of peaks parameter (Spd) greater than or equal to 0.020 $\mu m^{-2}$.

5 Claims, 2 Drawing Sheets

BONE-ANCHORED IMPLANT, AND METHOD FOR MANUFACTURING SUCH AN IMPLANT

TECHNICAL FIELD OF THE INVENTION

The present invention relates to the field of bone-anchored implants intended to be at least partially implanted and held in a bone of a living being such as a human or an animal.

Such bone-anchored implants are commonly used notably for consolidating or replacing part of a bone or of a joint.

Known bone-anchored implants include, for example, dental implants, intended to be implanted into the maxilla or the mandible of a patient so as to receive and support a dental prosthesis in the context of dental restoration.

Orthopedic implants are also known and include, for example, orthopedic hip prostheses. A hip prosthesis generally comprises two implantable parts constituting a ball joint, namely a female part intended to replace the natural socket (acetabulum) of the hip, and a male part intended to replace the femoral head.

The male part of the joint generally comprises a stem known as the femoral stem, intended to be inserted and anchored in the medullar cavity of the femur, and the proximal end of which is connected by a neck to a spherical head intended to enter the female part.

The female part of the joint, which is to replace the natural hip socket, and which is generally referred to as a socket, usually comprises a hemispherical insertion cup which is housed in a prepared acetabular cavity of the pelvic bone.

In all cases of bone-anchored implants, such as dental implants or orthopedic implants, it is important for the implant to be retained in the bone in which it is implanted with a retention force that is sufficiently high in the long term (long-term stability).

It is also important, after having been inserted into the bone, for the implant to gain good stability known as "primary stability" as quickly as possible so that it can become load-bearing as quickly as possible with a view to shortening the patient treatment time.

Furthermore, it is important to facilitate and/or accelerate the anchoring of implants into the bone of individuals exhibiting lower or impaired osteointegration capabilities, such as diabetics or smokers.

The manufacturers of bone-anchored implants have therefore been working for a very long time on the implant surface that is intended to come into contact with the bone in order to encourage osteointegration.

Thus, a method for treating the surface of implants (notably made of titanium or titanium alloy) known as BCP (biphasic calcium phosphate) has been developed, this method consisting in blasting the exterior surface of the implant with a powder which is a mixture of hydroxyapatite (HA) and of β-TCP (beta tricalcic phosphate), then in subjecting it to an attack with nitric acid ($HNO_3$), a rinsing and a drying operation.

There has also been developed a method for the surface treatment of implants (notably made of titanium or titanium alloy) referred to as SLA (sandblasted large grit acid etched) which consists in blasting the exterior surface of the implant then subjecting it to a double acid etch with hydrochloric acid and with sulfuric acid.

The STRAUMANN company has improved the SLA method by adding a step of drying under a nitrogen-rich atmosphere and hermetic preservation in an isotonic sodium chloride solution. This is a method tradename SLActive®.

The ASTRA TECH company, for its part, has proposed a method for the surface treatment of implants (notably made of titanium or titanium alloy) tradename "Osseo Speed" and which consists in blasting the surface of the implant with titanium dioxide particles, and then in chemically modifying the surface of the implant using hydrofluoric acid.

The BIOMET 3i company has proposed a method for the surface treatment of implants (notably made of titanium or titanium alloy) tradename "Nano Tite" which consists in forming on the surface of the implant a discontinuous layer using 10 to 100 nm particles of calcium phosphate deposited discretely. This layer produces a complex surface topography that is supposed to optimize the biological advantages of the calcium phosphate.

The NOBEL BIOCARE company has proposed a method for the surface treatment of implants (notably made of titanium or titanium alloy) tradename TiUnite® that consists in forming a porous surface made of titanium dioxide by electro-anodization from a machined implant surface.

However, all of these known methods offer performance that could benefit from significant improvement.

Furthermore, all of these known methods have been developed for metal implants (notably made of titanium or titanium alloy). Now, these days, there is a growing particular interest in ceramic implants, for esthetic reasons (particularly in the field of dentistry) and for reasons of biocompatibility. Specifically, metal implants (made of titanium or titanium alloys for example) have a very dark coloration which contrasts sharply with the natural coloration of the teeth. By contrast, the colors of ceramic materials can correspond very closely to the natural coloration of the teeth. Furthermore, metals and metal alloys unavoidably contain impurities in their chemical composition, which impurities can cause the organism to reject them.

Methods for the surface treatment of implants have thus been sought which also favor, accelerate and/or increase the osteointegration of implants, particularly for implants made of ceramic. Document EP 1 982 670 B1 describes such a method for an implant made of ceramic.

SUMMARY OF THE INVENTION

One problem proposed by the present invention is that of providing an implant with increased and/or accelerated and/or facilitated osteointegration.

At the same time, the invention seeks to provide a ceramic implant with increased and/or accelerated and/or facilitated osteointegration.

In order to achieve these objectives as well as others, the invention proposes an implant intended to be at least partially implanted into a bone by means of an implant part having an endosseous surface; according to the invention, said endosseous surface comprises at least one zone having a surface topography exhibiting:

an arithmetic mean peak curvature parameter (Spc) less than or equal to 1 $\mu m^{-1}$, a density of peaks parameter (Spd) greater than or equal to 0.020 $\mu m^{-2}$.

The applicant company has very surprisingly and unexpectedly found that a surface topography exhibiting such Spc and Spd parameters affords markedly improved osteointegration.

This improvement has been observed during testing which have notably demonstrated:

that the force required to extract the implant from the bone by pulling after 8 weeks is markedly increased, reflecting an improvement to the long-term stability of the implant, and/or that the force required to extract the implant from the bone by pulling after just 4 weeks is also markedly increased, reflecting an accelerated and/or facilitated osteointegration and therefore an improvement to the primary stability of the implant, and/or that a high proportion of the exterior surface of the implant finds itself more rapidly in contact with the bone.

These results also suggest that the anchoring of implants in the bone of individuals exhibiting the lower or impaired osteointegration capabilities, such as diabetics or smokers, is also facilitated and/or accelerated.

As a preference, for even better results, the ratio of the arithmetic mean peak curvature (Spc) to the density of peaks (Spd) may be comprised in the interval [5; 50].

Advantageously, the body of the implant may be made of ceramic, of metal, or of metal alloy.

As a preference, the implant may comprise a porous exterior layer having a thickness comprised between 1 and 5 μm. Such a thickness is not too high, so as to limit the risks of the porous exterior layer being friable, and to enable an efficient decontamination in the case of a peri-implantitis. Neither is this thickness too small, this being so as to preserve an effective topography.

Advantageously, for even better results, the density of peaks parameter (Spd) may be less than or equal to $0.5\ \mu m^{-2}$.

According to another aspect of the present invention, there is proposed a method for manufacturing an implant as described hereinabove, comprising the following successive steps:

a) supplying an implant body comprising an endosseous surface intended to be implanted into a bone, b) supplying a solution of an organic material in a solvent, said solution containing a particulate material in suspension, c) applying the solution to a zone of the endosseous surface of the implant body, d) evaporating the solvent, e) heating the implant body to a treatment temperature, the treatment temperature and duration being chosen to be high enough to eliminate the organic material and not high enough to cause the particulate material and the material constituting the implant body to melt.

Such a method is simple to implement on an industrial scale, and inexpensive.

Without the applicant company being able to be bound by any one theory, it would appear that:

after the solvent has evaporated, the organic material and the particulate material remain by adhesion on the surface of the implant body, the organic material contributing to maintaining spaces between the particles of the particulate material;

the removal of the organic material during step e) leads to a surface topography comprising peaks (of particulate material) and troughs (at the points where the organic material used to lie before being thermally eliminated).

During step e), the treatment temperature and duration that are chosen limit the risk of degradation (through total or partial melting) of the peaks created at the surface of the implant by the particulate material.

Advantageously, for good results in terms of osteointegration, before step e), steps c) and d) may be repeated several times, preferably at least 50 times. Repetition allows the surface topography to be built up progressively.

As a preference, the organic material may be a polymer, preferably a polyethylene glycol, more preferably still, a polyethylene glycol with a molecular weight of around 4000 g/mol. These then are organic materials that are simple, readily available and inexpensive.

Advantageously, in order to prepare the solution of step b), use is made of a volume of organic material that may be 1 to 20 times, preferably 1 to 10 times, more preferably still, 1 to 6 times, higher than the volume of particulate material. Indeed, it has been found that such ratios allowed a satisfactory surface topography to be obtained.

Advantageously, the particulate material is a powdered ceramic, preferably zirconia, or powdered metal, preferably titanium or a titanium alloy. Use will advantageously be made of a powdered ceramic in order to create a surface topography on the exterior surface of an implant made of ceramic. Use will advantageously be made of powdered metal to create a surface topography on the exterior surface of an implant made of metal.

As a preference, during step c), the solution may be applied to the implant body by spraying. Such a method of application has proved to be highly suitable for a solution containing a particulate material in suspension.

Advantageously, in the solution, the particulate material may represent 0.1% to 10% of the volume of the solution, preferably 0.5% to 1%.

As a preference, the particulate material has a median particle size less than or equal to 1 μm. The particle sizes and distribution are measured in accordance with the ISO 13320 standard, for example using liquid dispersion laser diffractometry on measurement equipment marketed under the tradename "MASTERSIZER 3000" by the company MALVERN PANALYTICAL.

According to one advantageous embodiment, steps may be taken to ensure that:

the implant body is made of ceramic, preferably of zirconia, more preferably still, of yttrium-doped or cerium-doped zirconia, the particulate material is a powdered ceramic, preferably a powdered zirconia, more preferably still, powdered yttrium-doped or cerium-doped zirconia, the organic material is polyethylene glycol.

Advantageously, during step e), the implant body may be heated to a treatment temperature comprised between 600° C. and 1600° C., preferably between 1100° C. and 1600° C., and, more preferably still, between 1300° C. and 1600° C. Such a treatment temperature proves to be advantageous for implant bodies made of ceramic. A sufficient minimum temperature allows the organic material to be correctly eliminated and for stable shapes and dimensions to be conferred upon the implant body and the surface topography thereof. A maximum temperature of below 1600° C. limits the risk of degrading the mechanical properties of the ceramic of the implant body.

As a preference, the implant body may be made of a ceramic, of a metal, or of an alloy of metals, of which the dimensions, during step e), do not vary by more than 3 to 5%. This then limits the risk of accidental detachment of the exterior layer (that forms the surface topography) from the body of the implant.

Advantageously, the implant body may be made of a ceramic, of a metal, or an alloy of metals, of which the density is at least 95% of its theoretical density. This then encourages the formation of peaks at the surface of the implant body through application of the solution containing a particulate material in suspension. Below the ratio of 95%, it has been found that the material of the implant body generally exhibits a porous structure which has too great a tendency to absorb the solution containing a particulate material in suspension, which detracts from the formation of a satisfactory surface topography.

The present invention is applicable to dental implants.

The present invention also applies to all other bone-anchored implants, such as orthopedic implants.

BRIEF DESCRIPTION OF THE DRAWINGS

Further objects, features and advantages of the present invention will become apparent from the following description of particular embodiments, which is given in connection with the attached figures, among which.

DESCRIPTION OF THE PREFERRED EMBODIMENTS

Where identical numerical references are used in a number of figures, embodiments, or variants of the invention, these numerical references refer to elements that are identical or similar in each of the figures, embodiments or variants.

Manufacturing Method

Figure 1:
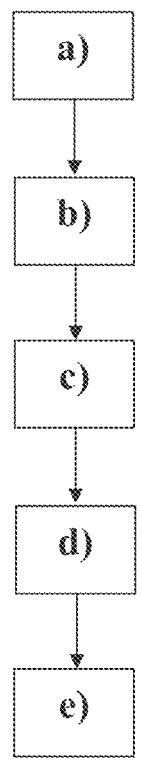
FIG. 1 is a diagram illustrating the various steps of one particular embodiment of a method for obtaining an implant according to the present invention.

FIG. 1 schematically illustrates an example of a method of manufacture that makes it possible to obtain an implant according to the present invention.

In this example, the method of manufacture comprises the following successive steps:
  a) supplying an implant body comprising an endosseous surface intended to be implanted into a bone,
  b) supplying a solution of an organic material in a solvent, said solution containing a particulate material in suspension,
  c) applying the solution to a zone of the endosseous surface of the implant body,
  d) evaporating the solvent,
  e) heating the implant body to a treatment temperature, the treatment temperature and duration being chosen to be high enough to eliminate the organic material and not high enough to cause the particulate material and the material constituting the implant body to melt.

Before step e), steps c) and d) are repeated several times, preferably at least 50 times. In other words, step e) is performed just once, after steps c) and d) have been repeated a sufficient number of times. Performing steps c) and d) 50 times has led to excellent topographies.

The organic material is a polymer, preferably a polyethylene glycol, more preferably still, a polyethylene glycol with a molecular weight of around 4000 g/mol.

In order to prepare the solution of step b), use is made of a volume of organic material that is 1 to 20 times, preferably 1 to 10 times, more preferably still, 1 to 6 times, higher than the volume of particulate material.

The particulate material is a powdered ceramic, preferably zirconia, if the implant body is made of ceramic. As an alternative, the particulate material is powdered metal, preferably titanium or a titanium alloy, if the implant body is made of metal.

During step c), the solution is applied to the implant body by spraying.

In the solution, the particulate material represents 0.1% to 10% of the volume of the solution, preferably 0.5% to 1%.

The particulate material has a median particle size less than or equal to 1 µm.

During step e), the implant body is heated to a treatment temperature comprised between 600° C. and 1600° C.

The implant body is made of a ceramic, of a metal, or of an alloy of metals, of which the dimensions, during step e), do not vary by more than 3 to 5%.

The implant body is made of a ceramic, of a metal, or an alloy of metals, of which the density is at least 95% of its theoretical density.

Figure 2:
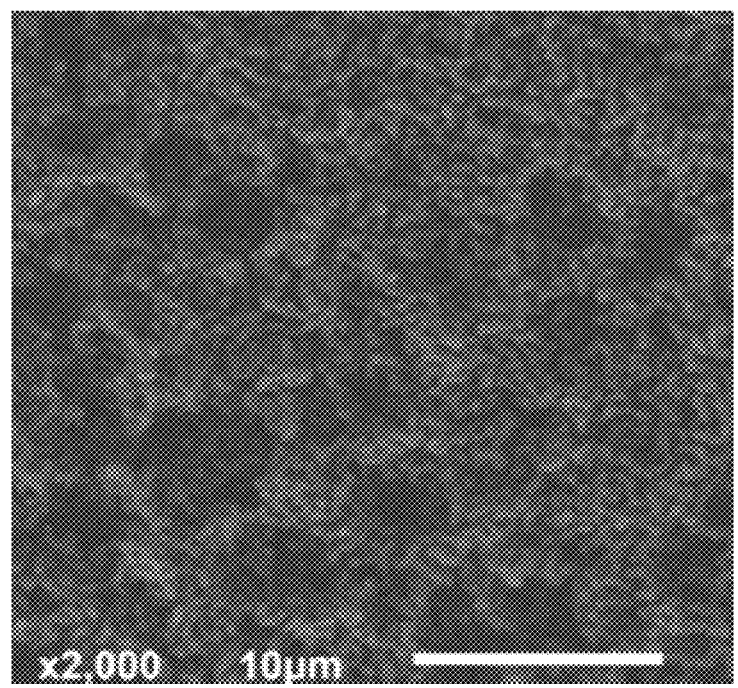
FIG. 2 is a view on micrometric scale of an example of surface topography obtained by the method of FIG. 1 on an implant body.

This method according to the invention has led to the example of surface topography illustrated in FIG. 2. In that figure, it may be seen that the surface topography obtained is in the form of a 1 to 5 µm surface layer of reduced density in which the ceramic particles are distributed almost uniformly, with a short distance between them. The ceramic particles form peaks between which there are troughs left by the organic material that has been eliminated during step e). No real pores were observed.

Shapes and Materials of the Implants Tested

Figure 3:
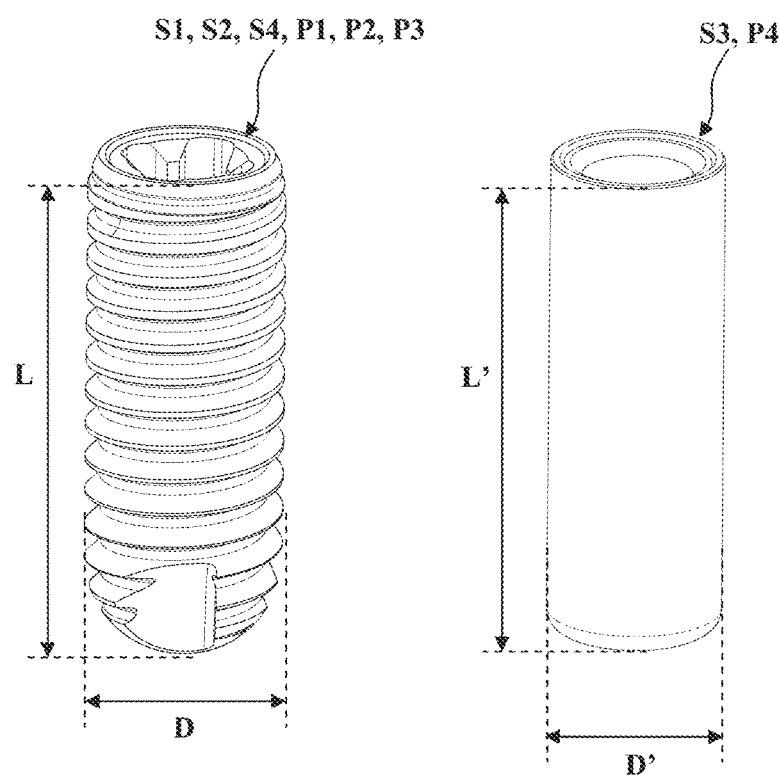
FIG. 3 is a view of various implants used during tests conducted by the applicant.

FIG. 3 illustrates a number of implants S1 to S4 and P1 to P4 used during testing.

The implants S1, S2, S4 and P1 to P3 have a cylindrical shape with a length L of 12 mm and a circular cross section with a diameter D of 4.6 mm. They are provided with the same external screw thread on their lateral surface so that they can be inserted by screwing them into a hole made in a bone.

The implants P4 and S3 have a cylindrical shape with a length L' of 12 mm and a circular cross section with a diameter D' of 4.2 mm. They have no external screw thread on their lateral surface and are intended to be inserted by impaction into a hole made in a bone.

The implants S1 to S4 and P1 are made of ceramic, more particularly of a mixture of cerium-doped zirconia and of alumina.

The implants P2 to P4 are made of metal. The implant P2 is more particularly made of a titanium alloy Ti13Zr. The implants P3 and P4 are more particularly made of a titanium alloy Ti6Al4V ELI.

Implants with Surface Topography According to the Invention

The "S" implants (S1 to S4) are implants according to the present invention, on the exterior surface of which a surface topography has been produced using the method of the present invention illustrated in FIG. 1.

During step c), a solution of organic material (polyethylene glycol with a molecular weight of around 4000 g/mol) in a solvent has been applied by spraying to the exterior surface of the implants S1 to S4, said solution containing a particulate material in suspension (consisting of a mixture of cerium-doped zirconia and of alumina).

The particulate material was thus a ceramic powder placed in suspension. In this suspension, 10% of the suspended particles had a size less than 0.15 µm, 50% of the suspended particles had a size less than 0.4 µm and 90% of the suspended particles had a size less than 2 µm. This particle size distribution of the particulate material was measured in accordance with the ISO 13320 standard by liquid-distribution laser diffractometry on measurement equipment marketed under the tradename "MASTERSIZER 3000" by the MALVERN PANALYTICAL company.

Steps c) and d) were repeated approximately 50 times before step e) was performed at the same treatment temperature of between 1350° C. and 1450° C. for each implant.

For the implant S1, use was made of a volume of organic material that was 2 times higher than the volume of particulate material. For the implants S2 and S3, use was made of a volume of organic material that was 4 times higher than the volume of particulate material. For the implant S4, use was made of a volume of organic material that was 6 times higher than the volume of particulate material.

The parameters Spc, Spd and the Spc/Spd ratios of the surface topographies of the implants S1 to S4 are given in table 1.

The topography of the surfaces was examined quantitatively on a surface measuring 351 µm×264 µm using a 3D confocal microscope (S-Neox, Sensofar Tech S.L, Terrassa, Spain). A confocal objective lens with a magnification of ×50 giving a lateral resolution of 0.26 µm was used. The total quantity of unmeasured points was below 5%.

All of the operations were applied to the result of the measurement using the SensoMAP software (SensoMAP, version 7.4.8803, SENSOFAR TECH, Terrassa, Spain) using the Mountains Map® software (issued by Digital Surf, Besancon, France) including the Grains and Particles module and the 3D advanced surface texture module.

The Spc and Spd parameters described in the 15025178 standard were extracted from the measurements which were taken by:
noise filtering (3×3 median filter),
applying a form removal F− operator ($5^{th}$-degree polynomial),
filling in the unmeasured points using a smooth form calculated from adjacent points,
applying an S-filter (0.8 µm×0.8 µm, gaussian filter),
applying an L-filter (25 µm×25 µm, robust gaussian filter),
thresholding in order to retain only the 95% of data centered around the median plane.

Implants with Surface Topography According to the Prior Art

The "P" implants (P1 to P4) are implants on the exterior surface of which a surface topography has been created according to known conventional methods. The implants P1 to P4 are thus control implants so that the effects afforded to the implants S1 to S4 by the present invention can be acknowledged.

The exterior surface of the implant P1 (made of ceramic) was blasted by particles of alumina ($Al_2O_3$) and then underwent two attacks, with hydrofluoric acid (HF) and with nitric acid ($HNO_3$).

The exterior surface of the implant P2 (made of metal) underwent a treatment of SLA type, with blasting, followed by a double acid etching operation using hydrochloric acid (HCl) and sulfuric acid ($H_2SO_4$).

The exterior surfaces of the implants P3 and P4 (made of metal) underwent a treatment of BCP type.

The Spc, Spd parameters and the Spc/Spd ratios of the surface topographies of the implants P1 to P4 were measured, as for the implants S1 to S4, and are given in table 2.

TABLE 2

Spc, Spd parameters and Spc/Spd ratios for the surface topographies of the implants P1 to P4

| | Spc ($µm^{-1}$) | | Spd ($µm^{-2}$) | | Spc/Spd (µm) | |
|---|---|---|---|---|---|---|
| Implant | Mean over 9 measurements | Standard deviation | Mean over 9 measurements | Standard deviation | Mean over 9 measurements | Standard deviation |
| P1 | 1.493 | 0.557 | 0.025 | 0.009 | 60.414 | 12.430 |
| P2 | 3.501 | 0.877 | 0.013 | 0.003 | 275.970 | 84.871 |
| P3 | 7.644 | 1.582 | 0.023 | 0.005 | 338.207 | 90.669 |
| P4 | 6.056 | 0.558 | 0.015 | 0.001 | 400.514 | 44.251 |

Extraction after In Vivo Implantation

Twelve implants S3 and twelve implants S4 were inserted into the humorous of twelve separate ewes. Each ewe received one implant S3 and one implant P4, implanted in its right or left humorous respectively. At the end of a period of 4 weeks following implantation, 6 ewes were slaughtered so that the implants could be extracted axially using an INSTRON tensile test machine fitted with a load cell. At the end of a period of 8 weeks after implantation, the remaining 6 ewes were slaughtered so that the implants could be extracted axially using the same INSTRON tensile test machine fitted with a load cell.

The results are given in table 3.

TABLE 0

Spc, Spd parameters and Spc/Spd ratios for the surface topographies of implants S1 to S4

| | Spc ($µm^{-1}$) | | Spd ($µm^{-2}$) | | Spc/Spd (µm) | |
|---|---|---|---|---|---|---|
| Implant | Mean over 9 measurements | Standard Deviation | Mean over 9 measurements | Standard Deviation | Mean over 9 measurements | Standard Deviation |
| S1 | 0.521 | 0.147 | 0.040 | 0.006 | 13.251 | 3.940 |
| S2 | 0.573 | 0.119 | 0.027 | 0.008 | 21.526 | 3.116 |
| S3 | 0.459 | 0.036 | 0.021 | 0.001 | 22.390 | 2.910 |
| S4 | 0.644 | 0.166 | 0.020 | 0.007 | 33.172 | 4.676 |

TABLE 3

Implant extraction forces

| | | Extraction force (N) | |
|---|---|---|---|
| Study time | Implant | Mean over 6 implants (N) | Standard deviation |
| 4 weeks | S3 | 870 | 160 |
| | P4 | 482 | 72 |
| 8 weeks | S3 | 975 | 284 |
| | P4 | 552 | 145 |

It may thus be seen that the implants S3 have a markedly higher resistance to extraction than the implants P4, whether this be at 4 weeks or at 8 weeks. At 4 weeks, the resistance to extraction of the implants S3 is around 80% higher than the resistance to extraction of the implants P4. At 8 weeks, the resistance to extraction of the implants S3 is around 77% higher than the resistance to extraction of the implants P4. The proportional increase between 4 and 8 weeks is substantially identical between the implants S3 (+12%) and P4 (+14%).

These results tend to demonstrate that the implants according to the invention offer significantly earlier osteointegration and that, in the longer term, the osteointegration is significantly better.

Measurement of the Proportion of the Exterior Surface of the Implant that is in Contact with the Bone after In Vivo Implantation Twelve of each of the implants S1, S2 and S4 (namely 36 implants) and twelve of each of the implants P1, P2 and P3 (namely 36 implants) were inserted into the femurs of twelve distinct ewes. Each ewe thus had 6 implants, namely 3 identical implants implanted in its right femur and 3 other identical implants in its left femur. At the end of a period 4 weeks after implantation, 6 ewes were slaughtered so that the BIC (bone to implant contact) parameter could be evaluated in order to determine the proportion of the exterior surface of the implant that was in contact with the bone. At the end of a period of 8 weeks after implantation, the remaining 6 ewes were slaughtered so that the BIC (bone to implant contact) parameter could be evaluated by tomography in order to determine the proportion of the exterior surface of the implant that was in contact with the bone.

The results are given in table 4.

TABLE 4

Proportion of the exterior surface of the implant in contact with the bone (BIC)

| | | BIC (%) | |
|---|---|---|---|
| Study time | Implant | Mean over 6 implants | Standard deviation |
| 4 weeks | S1 | 79.6 | 7.1 |
| | S2 | 73.8 | 2.5 |
| | S4 | 70.3 | 9.1 |
| | P1 | 42.4 | 18.4 |

TABLE 4-continued

Proportion of the exterior surface of the implant in contact with the bone (BIC)

| | | BIC (%) | |
|---|---|---|---|
| Study time | Implant | Mean over 6 implants | Standard deviation |
| | P2 | 55.8 | 11.3 |
| | P3 | 68.6 | 8.2 |
| 8 weeks | S1 | 78.4 | 5.4 |
| | S2 | 88.2 | 5.4 |
| | S4 | 76 | 10.8 |
| | P1 | 79.7 | 7.9 |
| | P2 | 75.9 | 6.2 |
| | P3 | 78.8 | 4.2 |

It is thus found that, at 4 weeks, the respective BIC parameters of the implants S1, S2 and S4 are all higher (and even very markedly higher as far as the implants S1 and S2 are concerned) than the respective BIC parameters of the implants P1, P2 and P3.

It is also found that, at 8 weeks, the BIC parameters of all the implants are relatively similar. However, the S2 implants demonstrate the highest BIC parameter.

These results tend to demonstrate that the implants according to the invention offer earlier osteointegration than the implants that have undergone known conventional surface treatments. Osteointegration is significantly better for the implants S2.

Finally, the tests conducted demonstrate that the present invention affords increased and/or accelerated and/or facilitated osteointegration, particularly in the case of an implant having an implant body made of ceramic.

Some of the work relating to the present invention was carried out in the context of the LONGLIFE consortium and has received funding from the European Union's seventh framework program for research (FP7/2007-2013) under grant agreement No. 280741.

The present invention is not restricted to the embodiments explicitly described but includes the diverse variants and generalizations thereof that fall within the scope of the attached claims.

The invention claimed is:

1. An implant intended to be at least partially implanted into a bone by means of an implant part having an endosseous surface, wherein said endosseous surface comprises at least one zone having a surface topography exhibiting:
    an arithmetic mean peak curvature parameter (Spc) less than or equal to 1 $\mu m^{-1}$,
    a density of peaks parameter (Spd) greater than or equal to 0.020 $\mu m^{-2}$.

2. The implant as claimed in claim 1, wherein a ratio of the arithmetic mean peak curvature (Spc) to the density of peaks (Spd) is comprised in an interval [5; 50].

3. The implant as claimed in claim 1, wherein a body of the implant is made of ceramic, of metal, or of metal alloy.

4. The implant as claimed in claim 1, wherein the implant comprises a porous exterior layer having a thickness comprised between 1 and 5 μm.

5. The implant as claimed in claim 1, wherein the density of peaks parameter (Spd) is comprised in an interval [0.020; 0.5].

* * * * *